United States Patent [19]
Blancheton

[11] Patent Number: 6,007,938
[45] Date of Patent: Dec. 28, 1999

[54] BATTERY WITH SPIRAL ELECTRODE ASSEMBLY

[75] Inventor: Olivier Blancheton, Begles, France

[73] Assignee: Alcatel, Paris, France

[21] Appl. No.: 09/045,535

[22] Filed: Mar. 23, 1998

[30] Foreign Application Priority Data

Mar. 24, 1997 [FR] France .................................. 97 03538

[51] Int. Cl.$^6$ .................................................. H01M 6/10
[52] U.S. Cl. .............................. 429/94; 429/144; 429/211
[58] Field of Search ............................. 429/94, 211, 247, 429/130, 131–133, 136, 139, 142, 144

[56] References Cited

U.S. PATENT DOCUMENTS

| | | | |
|---|---|---|---|
| 5,776,629 | 7/1998 | Degen et al. | 429/131 |
| 5,843,594 | 6/1997 | Cheong et al. | 429/94 |
| 5,932,370 | 6/1997 | Cheong et al. | 429/94 |

FOREIGN PATENT DOCUMENTS

| | | |
|---|---|---|
| 0391720A2 | 10/1990 | European Pat. Off. . |
| 2094491 | 2/1972 | France . |
| 3-190061 | 8/1991 | Japan . |
| 4-121949 | 4/1992 | Japan . |
| 5-062662 | 3/1993 | Japan . |
| 2274737 | 8/1994 | United Kingdom . |

OTHER PUBLICATIONS

Patent Abstracts of Japan, vol. 012, No. 476 (E–693), Dec. 13, 1988 corresponding to JP 63 195965 A (Matsushita Electric Ind Co Ltd) Aug. 15, 1988.
Patent Abstracts of Japan, vol. 013, No. 366 (E–806) Aug. 15, 1989 corresponding to JP 01 122574 A (Matsushita Electric Ind Co Ltd) May 15, 1989.

*Primary Examiner*—Maria Nuzzolillo
*Assistant Examiner*—Susy Tsang
*Attorney, Agent, or Firm*—Sughrue, Mion, Zinn, Macpeak & Seas, PLLC

[57] ABSTRACT

A battery includes a spiral electrode assembly obtained by winding a positive electrode and a negative electrode with a separator between them, at least one of the electrodes having a connection that projects from the assembly and the separator having a part that projects from the assembly and which is interleaved between the edge of the electrodes and the connection. The separator has first and second layers formed by two halves of a common strip, the projecting part being localized in a central part of the strip.

8 Claims, 2 Drawing Sheets

FIG_1

BATTERY WITH SPIRAL ELECTRODE ASSEMBLY

BACKGROUND OF THE INVENTION

1. Field of the Invention

The invention concerns a battery (cell, battery, etc) including an electrode assembly comprising at least two electrodes of opposite polarity and at least one separator.

2. Description of the Prior Art

In cylindrical batteries the spiral electrode assembly is obtained by winding the positive electrode and the negative electrode alternating with first and second separator layers. The separator insulates the positive electrode from the negative electrode and insulates the positive and negative exterior parts of the battery.

The electrode assembly is introduced into the cylindrical sealed metal casing. An electrolyte enabling ion exchange is introduced into the electrode assembly. A lid insulated from the casing is connected to the positive electrode, usually by welding, and forms the positive pole. An interior groove in the upper part of the casing locates the lid horizontally in the casing. The casing is crimped to the lid with a seal between them to seal the battery.

Short-circuiting of the cell by continuous or intermittent contact of the connection between the lid and the positive electrode with the top of the negative electrode must be avoided.

Such contact can occur during assembly of the cell, in which case it can be detected during in-production testing; however, it occurs mainly during normal charging and discharging of the cell due to thermal effects (expansion) and vibration. Short-circuits between the connection and the top of the electrode are associated with assembly problems such as:

the negative electrode shifting relative to the separator during winding, defective positioning of the lid during welding of the connection, and defective bending of the connection during closing of the lid.

Document JP-A-7 014 572 teaches the addition of an insulative washer above the electrode assembly to solve this problem. This solution has the drawback of requiring an additional manufacturing operation and of increasing the unit cost of the battery. Moreover, locating the washer correctly in the battery, whether manually or automatically, is not easy, given the presence of the connection, and defective location entails the risk of sealing problems or problems with locating the lid in the battery (tilting).

Document FR-2 094 491 describes a battery in which the conductive parts of the electrode project and are slit and bent perpendicularly to form a bearing surface resembling fish scales. The projecting ends of the separator are bent and engage to a greater or lesser degree between two consecutive scales, the effect of which is to enhance the elasticity of the bearing surface. This produces an overlap which makes it very difficult to impregnate the electrode assembly with the electrolyte and impedes the flow of gas during operation of the cell.

The aim of the invention is to propose a solution which avoids short-circuits but does not have the drawbacks mentioned above.

SUMMARY OF THE INVENTION

This aim is achieved in accordance with the invention by a battery including a spiral electrode assembly obtained by winding a positive electrode and a negative electrode with a separator between them. At least one of the electrodes has a connection that projects from the assembly and the separator has a part that projects from the assembly and which is interleaved between the edge of the electrodes and the connection. The separator has first and second layers formed by two halves of a common strip, the projecting part being localized in a central part of the strip.

The projection out of the assembly is obviously greater than the usual safety projection of the separator relative to the electrode, in order to obtain protection between the connection and the assembly.

For a spiral electrode assembly battery the part projecting from the assembly in this way is localized to one or more inner turns of the spiral, for example the innermost two turns.

When, in the conventional way, the two aforementioned layers of separator are formed by the two halves of a common separator strip, the projecting part is localized in a central part of said strip.

Said central part projects from one edge only of the strip, advantageously by an amount in the range 1 mm to 3 mm, and preferably in the range 1 mm to 2 mm, relative to the remainder of the strip.

The projecting central part can comprise the strip itself, cut to form the projection on one edge. A conventional central reinforcing layer known as the "additive" can also be used to form the projecting part. The usual function of the additive is to strengthen the separator at the starting point of the electrodes (the center of the electrode assembly) from edges and breaks in the positive and negative electrodes.

This additive, used in accordance with the invention to form the highest part of the separator strip, can be either an initially separate part made from the same material as the strip or from a different material (for example ultrasonically welded to a few points on the strip), or a lug formed in the strip itself and bent back on itself.

The invention preferably applies to small prism-shape or cylindrical cells. It concerns in particular nickel-cadmium (Ni—Cd), nickel-metal hydride (Ni—MH) and lithium cells such as lithium-carbon cells (Li—C or Li—ion).

Other features and advantages will emerge from the following description with reference to the appended drawings.

DETAILED DESCRIPTION OF THE PREFERRED EMBODIMENT

Figure 1:
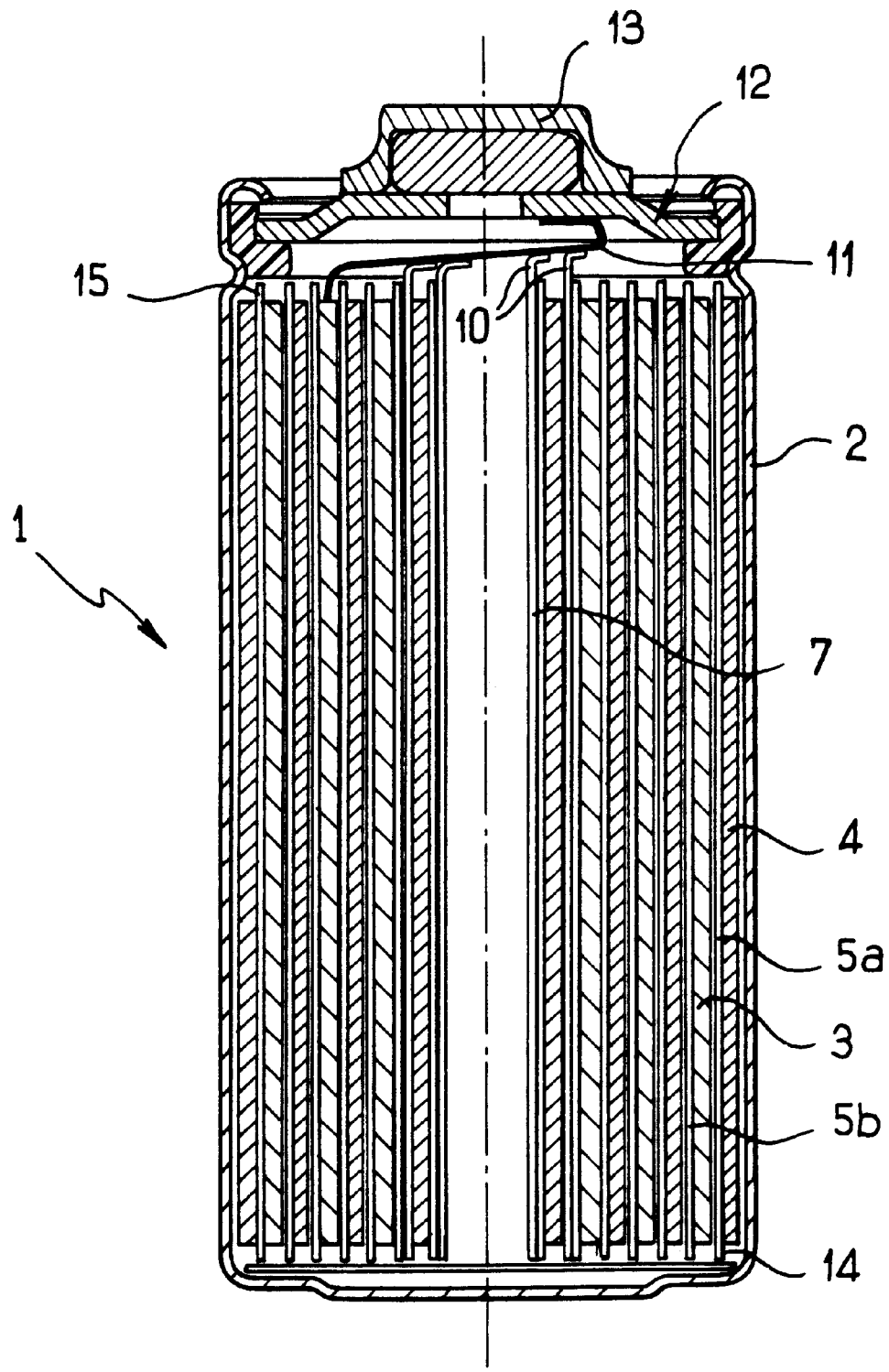
FIG. 1 is a sectional view of a battery incorporating the invention (the diagram is not to scale in order to show the projections more clearly).
Figure 2:
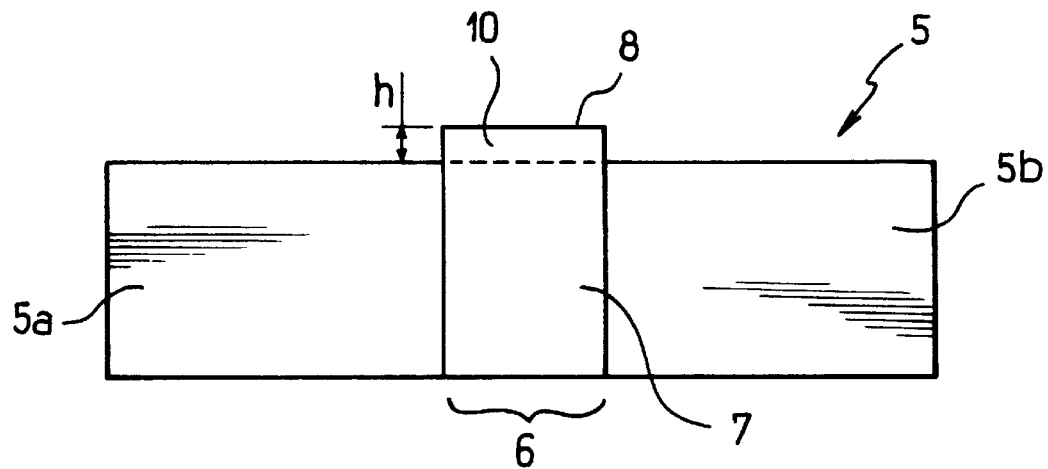
FIG. 2 is a front view of a separator and its additive in accordance with the invention.
Figure 3:
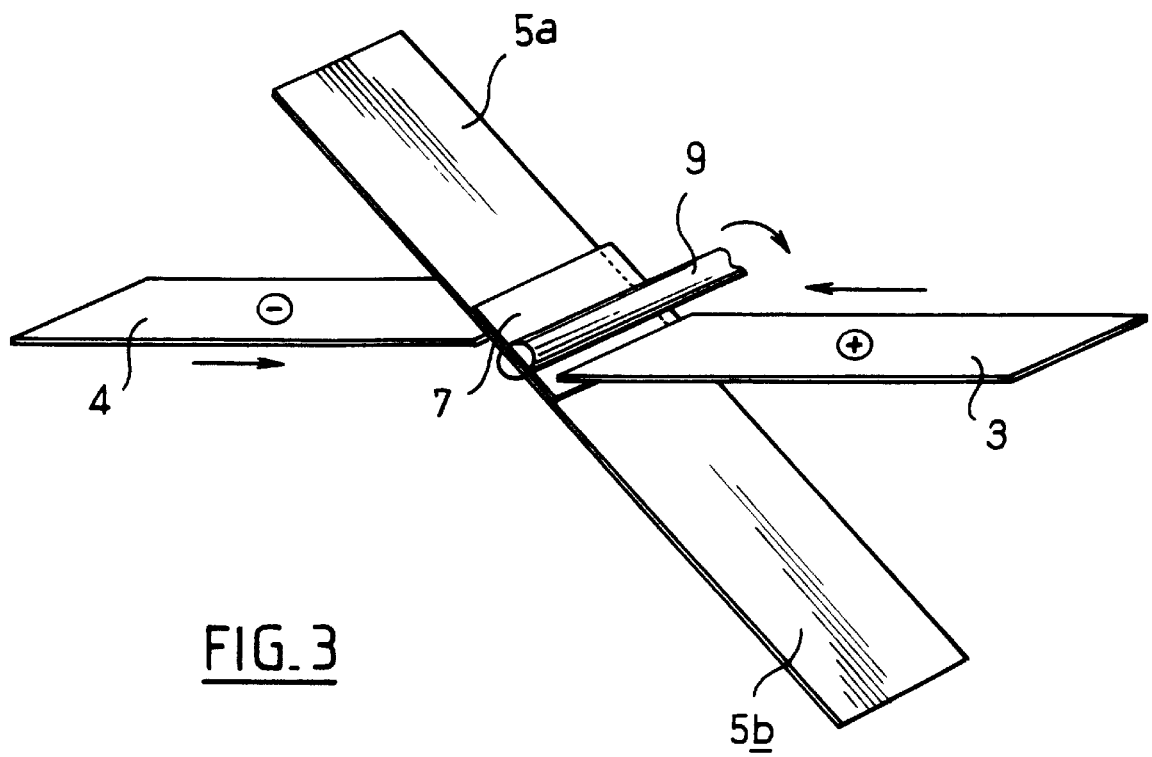
FIG. 3 is a diagrammatic perspective view of the components of a spiral electrode assembly in accordance with the invention.

The cylindrical battery 1 includes a cylindrical casing 2 in which the spiral electrode assembly is housed.

The electrode assembly includes a flexible rectangular positive electrode plate 3, a flexible rectangular negative electrode plate 4 and a rectangular separator strip 5 with two halves 5a and 5b.

The additive 7 is superposed on the central part 6 of the strip 5 and is in the form of a rectangle projecting from the upper edge of the strip to a height h.

The additive 7 can be an initially separate part made from the same material (felt) as the separator and welded to it, for example ultrasonically welded to it at four points, or a lug cut out from the blank from which the strip 5 is made and bent back on itself along a line 8 constituting after bending the top edge of the additive 7.

As is known in itself in the manufacture of spiral electrode assembly batteries, pins 9 are placed around the central part 6 of the strip to enable it to be wound in successive turns in which the positive electrode 3, the half 5b of the separator, the negative electrode 4 and the half 5a of the separator 5 alternate.

On completion of the winding operation the part 10 of the additive 7 that projects from the strip 5 is on the innermost turn or turns of the electrode assembly, for example two contiguous turns as shown in FIG. 1.

Accordingly, when the positive electrode 3 is connected by a connection 11 to the lid 12 of the casing, in electrical contact with the positive terminal 13, the projections 10 of the central turns of the electrode assembly prevent the connection 11 accidentally contacting the negative electrode.

FIG. 1 shows that, apart from the greater projections 10 at the center of the electrode assembly, the separator 5 projects above and below the electrodes (reference numbers 14, 15) by the usual amount in the range 1.5 mm to 2 mm preventing accidental contact between the positive and negative electrodes during winding.

There is claimed:

1. A battery including a spiral electrode assembly obtained by winding a positive electrode and a negative electrode with a separator between them, at least one of said electrodes having a connection that projects from said assembly and said separator having a part that projects from said assembly and which is interleaved between the edge of said electrodes and said connection, wherein said separator has first and second layers formed by two halves of a common strip, said projecting part being localized in a central part of said strip.

2. The battery claimed in claim 1 wherein said projecting part is localized to one or more interior turns of the spiral.

3. The battery claimed in claim 1 wherein said central part projects from one edge of the strip relative to the remainder of the strip.

4. The battery claimed in claim 3 wherein said central part projects from the edge of said strip by an amount in the range 1 mm to 3 mm.

5. The battery claimed in claim 1 wherein said central part consists of said strip itself.

6. The battery claimed in claim 1 wherein said central part of said strip consists of an additive forming a reinforcing layer.

7. The battery claimed in claim 6 wherein said additive consists of a lug formed in said strip itself and bent back onto said strip.

8. The battery claimed in claim 6 wherein said additive is made from the same material as the strip.

* * * * *